F. W. JAHN.
MANUFACTURE OF ORGANIC ACID ANHYDRIDS.
APPLICATION FILED MAR. 27, 1909.
1,195,227.
Patented Aug. 22, 1916.
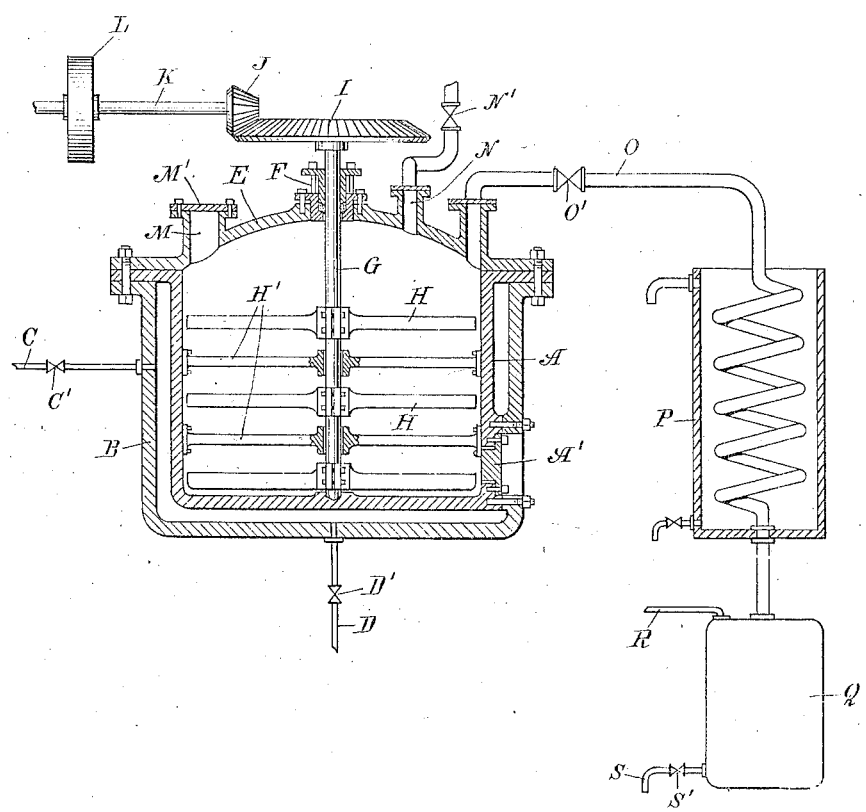
WITNESSES:
INVENTOR
FREDRIK W. JAHN
BY
ATTORNEYS

UNITED STATES PATENT OFFICE.

FREDRIK W. JAHN, OF NEW YORK, N. Y., ASSIGNOR TO GENERAL CHEMICAL COMPANY, OF NEW YORK, N. Y., A CORPORATION OF NEW YORK.

MANUFACTURE OF ORGANIC-ACID ANHYDRIDS.

1,195,227.        Specification of Letters Patent.        Patented Aug. 22, 1916.

Application filed March 27, 1909. Serial No. 486,271.

*To all whom it may concern:*

Be it known that I, FREDRIK W. JAHN, a subject of the King of Norway, and resident of the borough of Manhattan, city, county, and State of New York, have invented certain new and useful Improvements in the Manufacture of Organic-Acid Anhydrids, of which the following is a specification.

My invention relates to a new process of making organic acid anhydrid.

I have discovered that when sodium, calcium or zinc acetate or sodium propionate, each of which is a salt of an organic acid more specifically, a fatty acid salt, is suitably acted upon by chlorin or by bromin, each of which is a halogen, in the presence of sulfur, iron sulfid, copper sulfid, the ore known as pyrrhotite, the ore known as pyrite, sodium sulfid, sodium hydrosulfite, sodium thiosulfate (also known as sodium hyposulfite) or sodium metabisulfite, each of which is a non-gaseous, more specifically a solid substance containing oxidizable sulfur that is a sulfur-containing reagent, acetic anhydrid or propionic anhydrid, as the case may be, each of which is an organic acid anhydrid more specifically a fatty acid anhydrid, is produced. Upon this discovery I have based my invention, the nature of which I illustrate by means of the following examples but in so doing I wish to be understood as not limiting myself to the exact details therein laid down for these can be variously changed without materially affecting the invention. The parts are by weight.

*Example 1—Using sodium metabisulfite.—* Anhydrous sodium bisulfite is first prepared by passing sulfur dioxid gas through an emulsion or suspension of normal sodium sulfite in water until this is converted into sodium bisulfite and crystallizes out in anhydrous state. This sodium bisulfite is preferably first dried in a centrifugal machine and then in a drier under vacuum at a temperature of 70° C. until it loses substantially all its water and passes over into anhydrous sodium metabisulfite. Anhydrous sodium acetate is then prepared by fusing crystallized sodium acetate. A mixture, preferably intimate, is now made up, of one hundred and ninety (190) parts of the anhydrous sodium metabisulfite (absolute) and three hundred and twenty eight (328) parts of anhydrous sodium acetate (absolute), both being in the form of a fine powder, preferably of such a fineness that the powder will pass through a sieve having approximately one hundred (100) meshes to the linear inch. This mixture is charged into a closed jacketed vessel provided with a mechanical stirrer and into this vessel is continuously introduced dry chlorin gas, the mixture being kept at a temperature of from forty to fifty (40 to 50) deg. C. This temperature is maintained by warm water inside the jacket of the reaction vessel. When chlorin is no longer being absorbed which will be the case when about one hundred and forty-two (142) parts of chlorin have been introduced, the warm water is emptied out of the jacket and steam under one hundred (100) lbs. pressure is introduced into the jacket; at the same time a vacuum, preferably a high vacuum, (say 28 inches of mercury) is gradually applied to the vessel containing the chemicals. The acetic anhydrid formed is then distilled over and condensed, preferably in a lead condenser and purified if necessary.

Since filing this application applicant has found in practice that he can substitute 492 parts of sodium acetate for the 328 parts mentioned in the above example without in any other way departing from the proportions and conditions specified in said example, and that with such substitution better output is obtainable.

Care should be exercised not to introduce chlorin much in excess of the indicated portion, nor to raise the temperature much above the indicated range, lest the acetic anhydrid be contaminated by organic chlorination products, thus reducing the yield and increasing the cost of the product desired.

*Example 2—Using sodium thiosulfate (hyposulfite).—* Crystallized sodium thiosulfate (known commercially also as hyposulfite of soda) is made anhydrous by heating and ground up into a fine powder. One hundred and fifty-eight (158) parts of this anhydrous pulverized thiosulfate of soda is mixed with eight hundred and twenty (820) parts pulverized anhydrous sodium acetate, preferably as in Example 1. This mixture is treated with about two hundred and eighty-four (284) parts dry chlorin gas in a suitable vessel such as described above and the resulting acetic anhydrid may be distilled off and condensed as described above and purified if necessary. The caution given under Example 1 applies equally to this Example 2. I have further found that the percentage yield and the quality of the product are the more satisfactory the more completely water, in any form, is excluded during the carrying out of the operation.

In the accompanying drawing I have shown a specific form of apparatus for carrying out my invention, in which A represents a closed vessel for the mixture. This vessel is preferably surrounded by a jacket B into which water or steam may be introduced through the pipe C for maintaining the temperature of the vessel A at the desired point. A pipe D may be provided for withdrawing the water or steam from the jacket B it being understood that both of the pipes C and D are preferably controlled by means of valves C' and D' respectively. The vessel A is closed through the medium of a cover E in which is secured a stuffing box F through which the shaft G extends. The said shaft G has its inner end journaled in the bottom of the vessel A. Stirring arms H are secured to said shaft at intervals within the vessel A and stationary baffle bars H' are located between the stirring arms for the purpose of holding the material and also serve as additional bearings for the shaft G. A bevel gear I is fastened to the upper end of the shaft G and meshes with a bevel pinion J carried by a shaft K, rotatably mounted in suitable stationary bearings and provided with a belt pulley L to which power may be applied in any convenient manner. The cover E is provided with a charging aperture M for the reaction mixture, said aperture being normally closed by means of a cover M'. The said cover E is further provided with an inlet N controlled by a valve N', through which the chlorin is introduced.

O is an outlet pipe for the anhydrid vapors, controlled by a valve O' and connected with a condenser P.

Q is a vacuum receiver for the anhydrid, connected with the usual coil located in the condenser P the air being exhausted from said receiver through a pipe R.

S is an outlet pipe controlled by a valve S'. The vessel A, if desired, may be provided with a suitable door A' for cleaning purposes.

I claim as my invention:

1. The process of making an organic acid anhydrid which consists in bringing about a reaction between a salt of an organic acid, a halogen and a non-gaseous substance containing oxidizable sulfur.

2. The process of making an organic acid anhydrid which consists in bringing about a reaction between a salt of an organic acid, a halogen and a solid substance containing oxidizable sulfur.

3. The process of making an organic acid anhydrid which consists in bringing about a reaction between a salt of an organic acid, chlorin and a solid substance containing oxidizable sulfur.

4. The process of making acetic anhydrid which consists in bringing about a reaction between a salt of acetic acid, chlorin and a solid substance containing oxidizable sulfur.

5. The process of making acetic anhydrid which consists in bringing about a reaction between a salt of acetic acid, chlorin and sodium metabisulfite.

6. The process of making acetic anhydrid which consists in bringing about a reaction between sodium acetate, chlorin and sodium metabisulfite.

7. The process of making acetic anhydrid which consists in mixing a salt of acetic acid with sodium metabisulfite bringing into contact with this mixture the requisite amount of chlorin, maintaining the whole at a temperature within the range of 40° to 50° centigrade, until the completion of the reaction desired and separating the resulting acetic anhydrid.

8. The process of making acetic anhydrid which consists in mixing a salt of acetic acid with sodium metabisulfite, bringing into contact with this mixture the requisite amount of chlorin, maintaining the whole at a temperature within the range of 40° to 50° centigrade, until the completion of the reaction desired and separating the resulting acetic anhydrid by distillation.

9. The process of making acetic anhydrid which consists in mixing a salt of acetic acid with sodium metabisulfite, bringing into contact with this mixture the requisite amount of chlorin, maintaining the whole at a temperature within the range of 40° to 50° centigrade, until the completion of the reaction desired, and separating the resulting acetic anhydrid by distillation under diminished pressure.

10. A process of producing fatty acid anhydrids, which consists in mixing a fatty acid salt with a sulfur containing reagent and treating the mixture with chlorin.

11. A process of producing fatty acid anhydrids, which consists in mixing a fatty acid salt with a sulfur containing reagent, both being in a dry state, and treating the mixture with chlorin.

12. A process of producing acetic anhydrid which consists in mixing an acetate with a sulfur containing reagent, both being in a dry state, and treating the mixture with chlorin.

13. A process of producing acetic anhydrid, which consists in mixing sodium acetate and a sulfur containing reagent, both being in a dry state, and treating the mixture with chlorin.

In testimony whereof I have hereunto set my hand in the presence of two subscribing witnesses.

FREDRIK W. JAHN.

Witnesses:
JOHN LOTKA,
JOHN A. KEHLENBECK.